United States Patent Office 3,839,519
Patented Oct. 1, 1974

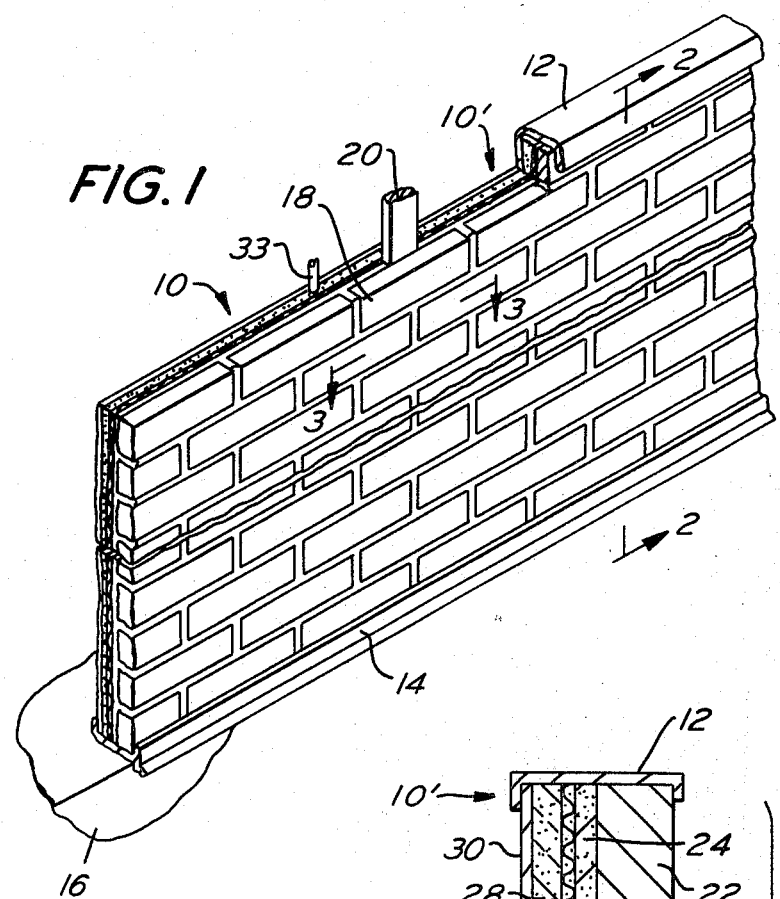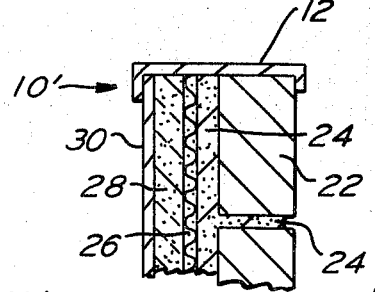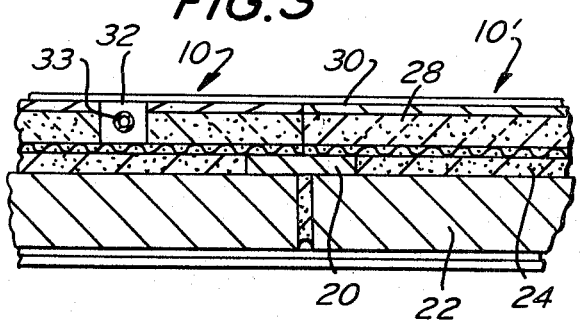

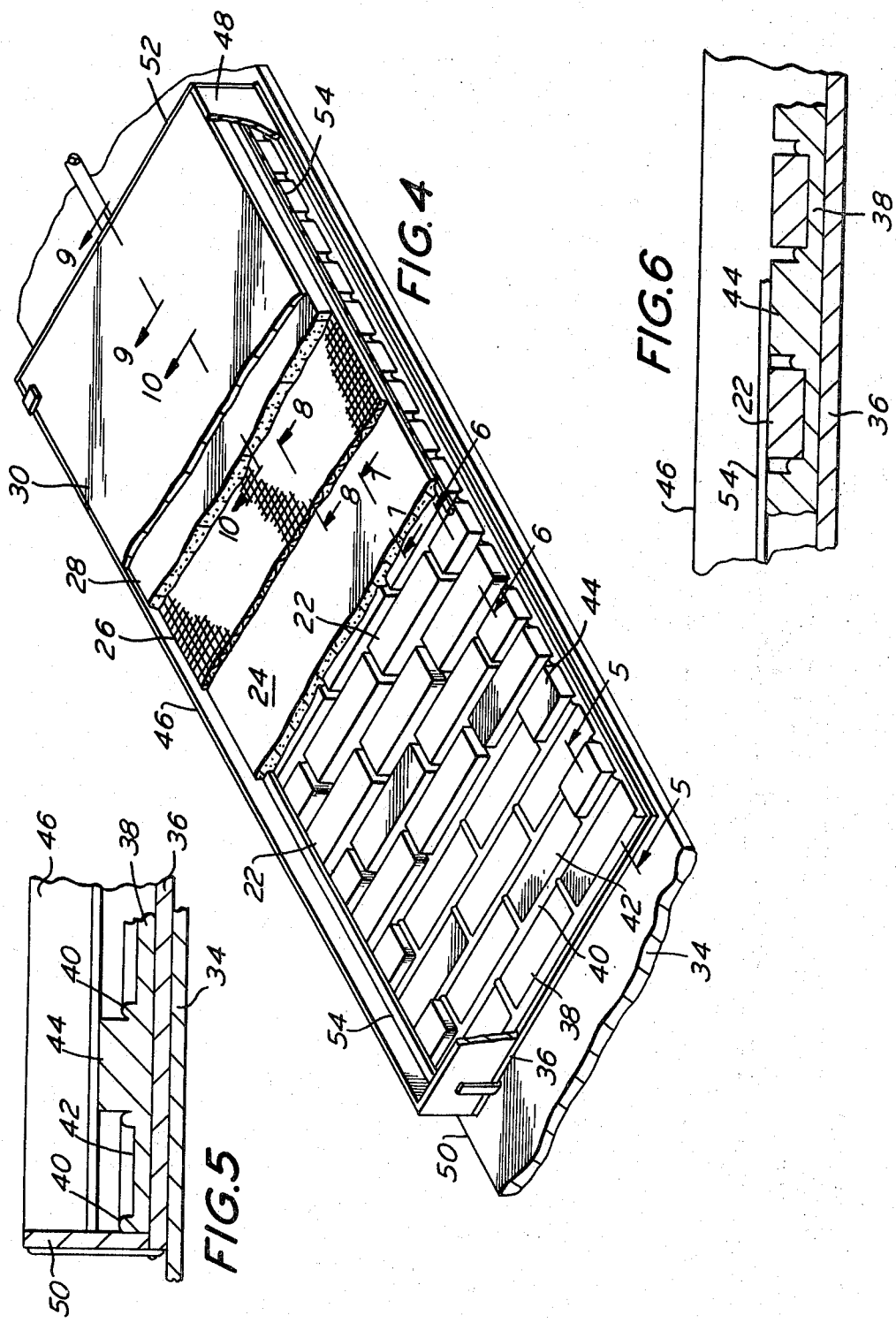

3,839,519
METHOD OF MAKING BUILDING PANEL
Gershen Weiner, 1125 N. 16th St.,
Allentown, Pa. 18102
Application Jan. 11, 1971, Ser. No. 105,686, which is a continuation-in-part of application Ser. No. 20,764, Mar. 18, 1970. Divided and this application Dec. 26, 1972, Ser. No. 318,153
Int. Cl. B29d 27/00
U.S. Cl. 264—45                    9 Claims

ABSTRACT OF THE DISCLOSURE

Building panels adapted to form the exterior enclosure of a prefabricated home are disclosed and the method of making same. The building panels are a sandwich composed of masonry elements such as bricks, synthetic polyester mortar, reinforcing wire mesh, a polymer foam, and a suitable inner facing layer, all held together by the mortar and foam. The method includes placing bricks in the desired arrangement of a support layer, joining the bricks by applying polyester mortar to the back side of the bricks and between adjacent bricks, applying the reinforcing wire mesh within the mortar, spacing the outer facing layer from the wire mesh, and then introducing a foam polymer which is cured in the space between the wire mesh polyester and the outer facing layer.

DISCLOSURE

This is a division of copending application Ser. No. 105,686 filed Jan. 11, 1971 and entitled "Building Panel and Method of Making Same."

Said copending patent application is a continuation-in-part of my patent application Ser. No. 20,764, filed Mar. 18, 1970, now abandoned, entitled: Building Panel and Method of Making Same.

The present invention is directed to a method of making prefabricated building panels. The building panels of the present invention are desirably of suitable dimensions whereby they may be positioned on a foundation and supported in a manner whereby they form the perimeter wall of a dwelling. One surface of the panel constitutes the outer face of the dwelling, while the opposite surface of the panel constitutes the exposed wall of a room in the dwelling. In order to accomplish these objects, I prefer to make panels that are four feet wide and nine feet high. While these dimensions represent the most convenient size in terms of economics and raw materials, other sizes may be utilized. In this regard, it is contemplated that the smaller size panels are often necessary for the top and bottom window sections.

The panels utilized in forming the perimeter of a wall of a dwelling include planar panels and corner panels which are generally L-shaped. There is described hereinafter the specific details with respect to the planar panels and method of making the same. The following description applies equally well to the corner or L-shaped panels.

The panels of the present invention are manufactured on a conveyor whereby the layer of the panels becomes increasingly thicker up to the finished thickness of the panels. The first layer of the sandwich panel of the present invention which is applied to the conveyor is the masonry elements such as bricks which form the exterior surface of the dwelling. Thereafter, the bricks are laterally joined to each other and provided with a coating across their uppermost surface of a polyester mortar. A reinforcing wire mesh is thereafter applied within the polyester mortar on the back of the bricks. Additional polyester mortar may be added so the polyester mortar penetrates through the wire mesh. Thereafter, an inner facing layer representing the wall on the inside of the dwelling is positioned on the mold so as to be spaced from the wire mesh. Between the polyester mortar at the back of the brick and the inner facing layer, a low density organic insulation, such as a cellular core foam material is introduced and cured in situ.

It is an object of the present invention to provide a novel low density heat insulating building panel which is simple, economical to build, and reliable for use in constructing the wall of the prefabricated building.

It is another object of the present invention to provide a method for economically manufacturing the building panels of the present invention.

Other objects will appear hereinafter.

For the purpose of illustrating the invention, there are shown in the drawings forms which are presently preferred; it being understood, however, that this invention is not limited to the precise arrangements and instrumentalities shown.

FIG. 1 is a partial perspective view of a wall constructed with the building panels of the present invention.

FIG. 2 is a sectional view taken along the line 2—2 in FIG. 1.

FIG. 3 is a sectional view taken along the line 3—3 in FIG. 1.

FIG. 4 is a partial perspective view of a building panel of the present invention being manufactured, and illustrating various components of the panel.

FIG. 5 is a sectional view taken along the line 5—5 in FIG. 4 and illustrates the first step in the process.

FIG. 6 is a sectional view taken along the line 6—6 in FIG. 1 and illustrates the second step in the process.

Figure 7:
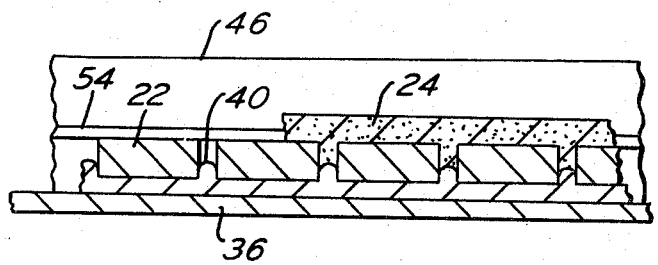
FIG. 7 is a sectional view taken along the line 7—7 in FIG. 4 and illustrates the next step in the process.

Referring to the drawing in detail, wherein like numerals indicate like elements, there is shown in FIG. 1 a wall of a building comprised of panels 10 and 10' made in accordance with the present invention. The panels have been inserted into a top channel 12 and a bottom channel 14. Channel 14 rests on the foundation 16. The wall illustrated in FIG. 1 is comprised of panels 10 and 10' which have been interconnected by a spline 20 and facing bricks which have been field applied after the panels have been interconnected and positioned within the channels 12 and 14. The field applied bricks are brick 18 and those directly therebelow in every other row. The remainder of the wall of the dwelling is similarly formed with interconnected panels made in accordance with the present invention.

As shown more clearly in FIGS. 2 and 3, each of the panels 10 and 10' are identical and include an exterior surface of the wall defined by bricks 22 vertically and horizontally interconnected with each other by mortar 24 of a type described hereinafter. A layer of the polyester mortar 24 is applied to the rear surface of the bricks 22. A reinforcement wire mesh 26 is interposed within the layer of mortar 24 and a layer of low density organic insulation such as foam polymer 28. Except around the edges of the panels which are concealed during installation, layer 28 is completely concealed to prevent deterioration from ultra violet light. The inner surface of the wall defining the room within the dwelling is the inner facing layer 30.

The inner facing layer 30 may be any one of a wide variety of prefinished materials utilized heretofore as defining the surface of walls in buildings such as gypsum board, sheet rock, prefinished plywood panels, etc. The foam polymer 28 may be any one of a wide variety of commercially available urethane foams having closed cells and particularly adapted for use as insulation against heat or cold. While a wide variety of such urethane foams are available for use as insulation (see discussion of polyurethane foams for insulation purposes set forth in *Rigid Plastic Foams,* by T. H. Ferrigno, Reinhold Publishing Corporation, Second Edition, pages 170 through 183), I prefer to use the Electrofoam urethane foam system of PPG Industries, Inc., of Pittsburgh, Pa., described herein after, having a low K factor. These polyurethane foams have the lowest K factor of all commercial insulation materials, and are slow rise foams permitting even distribution, and may be applied by frothing.

The bricks 18 and 22 are thinner than conventional bricks but are otherwise of the same dimensions and configurations. I prefer to use bricks 18 and 22 with a thickness measured from front to back of about ⅜ to ⅝ inches. The mortar 24 joins adjacent bricks in all horizontal and vertical directions and must be a fast drying mortar capable of acting as an adhesive so that it may perform this bonding function. I prefer to use as the mortar 24 a mixture of sand and a polyester resin which may be poured or sprayed. If desired, a coloring pigment and an ultra violet inhibitor can be added to the mixture. While the percentage of sand and polyester resin may be varied as desired, I prefer to use 60 to 80% by weight of sand and 40 to 20% by weight of polyester.

The preferred polyester resin used by me is Selectron #5265 having a specific gravity of 1.11, a weight of 9.3 pounds per gallon, and a viscosity of 2.75 Brookfield centipoises.

The panels 10 and 10' may have therewithin an electrical outlet box 32 accessible from within the room of the dwelling. The electrical outlet box 32 is provided with a wireway conduit 33 extending from the top of the panel down to the outlet box 32 which in turn is generally approximately 18 inches from the lower end of the panel. It will be noted that the electrical outlet box 32 is flush with the inner facing layer 30.

The panels 10 and 10' are made in the identical manner as follows:

Referring to FIG. 4, there is shown a portion of a conveyor 34. The conveyor 34 is preferably a conveyor supported in a convenient manner whereby it can withstand the weight of the panels as the panels are constructed. The conveyor 34 may be constructed of a plurality of closely fitting transverse slats. Conventional means may be utilized to intermittently move the conveyor 34 during the process of manufacturing the panels 10.

The base sheet 36 of a material such as plywood is applied on top of the conveyor 34 so as to provide a uniform smooth surface. A form sheet 38 is applied on top of the base sheet 36 as shown. The form sheet 38 is made of a tough polymer which will not stick to the polyester mortar 24. I have found that "Kydex," an acrylic-polyvinyl chloride alloy plastic sheeting material made by Rohm & Haas Company of Philadelphia, Pa., may be used as the form sheet 38. Kydex will not stick to the polyester mortar.

Form sheet 38 is provided with upstanding intersecting ridges curved at their top and designated by the numeral 10. Four such ridges 40 define a pocket or cavity 42.

The form sheet 38 is provided with integral one-piece half bricks of Kydex 44 on its uppermost surface only along the side edges thereof. The half bricks of Kydex 44 are positioned in every other row so as to partially define the cavities within which the bricks 18 will be applied in the field.

Mold sides 46 and 48 are vertically disposed and co- operate with mold ends 50 and 52. The sides and ends are releasably interconnected with the base sheet 36. The base sheet 36 is slightly larger than the form sheet 38 whereby the mold sides and ends rest on the upper periphery of the base sheet 36 and are removably attached thereto by suitable brackets.

Figure 8:
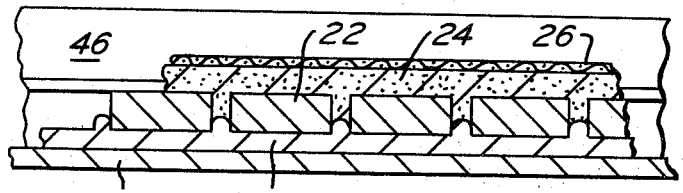
FIG. 8 is a sectional view taken along the line 8—8 in FIG. 4 and illustrates the next step in the process.

The bricks 22 are positioned in each of the pockets 42 and have a height which corresponds to the height of the half bricks 44 as will be apparent from FIG. 6. The bricks 22 are preheated before they are positioned in the cavities 42 so that they do not absorb heat from the foam polymer 28, such as to a temperature of between 120° F. to 180° F., and preferably about 150° F. Thereafter, spline filler members 54 are positioned on top of the side edges of the bricks along the mold sides 46 and 48. The filler members 54 will define one-half of the cavity into which the spline 20 will be received. A reinforcing wire mesh 26 is applied to the upper surface of the layer of the bricks 22. See FIG. 8. Thereafter, the polyester mortar 24 is sprayed or poured on top of the wire mesh 26 above the bricks 22 and the filler bricks 44. The polyester mortar extends through the wire mesh 26 and adheres to the underlying bricks 22, whereby the mesh becomes positioned within such mortar. The mortar is spread evenly so as to have a desired thickness, such as of approximately ⅛ to ¼ inch thick. Mortar 24 also enters the space between adjacent bricks and will be contoured by the rounded upper surface on the ridges 40 so as to simulate mortar which has been pointed. The mortar 24 lends strength to the entire panel 10 while intimately bonding adjacent bricks to one another.

Figure 9:
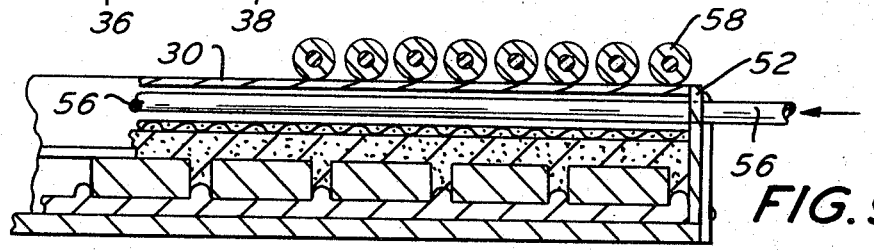
FIG. 9 is a sectional view taken along the line 9—9 and illustrates the next step in the process.

The next step is to position the inner facing layer 30 on top of the mold so that it is supported by the mold. If electrical outlet 32 is to be part of the panel, the outlet and its wireway conduit are positioned in the space below layer 30 at this time. Thereafter, the conveyor 34 will have moved to a position wherein a means will be provided to hold the layer 30 in intimate contact with the sides and ends of the mold and prevent the entire composite from separating. Such means may be a platen or may be a series of rollers 58 as shown in FIG. 9. The length of the rollers 58 should be sufficient to extend across the full width of the layer 30 while being closely adjacent to one another for the full length of the layer 30.

Thereafter, a conduit 56 is introduced through a hole in one of the ends such as a hole in the end 52. Conduit 56 is of sufficient length so that it may extend to a position adjacent end 50 while being disposed within the space or cavity between layer 30 and the reinforcement mesh 26. The foam polymer such as foam polyurethane is then intermittently introduced through the conduit 56 at a frothing temperature of about 155° F.[1] Each time the flow of foam polymer is terminated, the conduit 56 is withdrawn by a uniform amount. A sufficient number of such steps is repeated, namely discharging of foam polymer and then withdrawing a portion of the conduit 56, until the conduit 56 has been withdrawn through the opening in end 52. Thereafter, end 52 is closed in any convenient manner such as by threading a plug into the opening in end 52. By this time, mortar 24 has cured.

Figure 10:
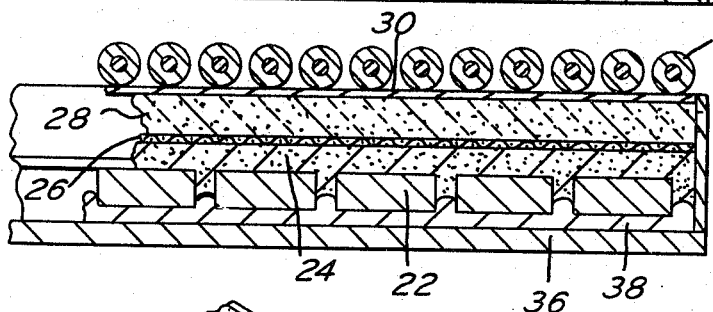
FIG. 10 is a sectional view taken along the line 10—10 in FIG. 1 and illustrates the last step of the process.
Figure 11:
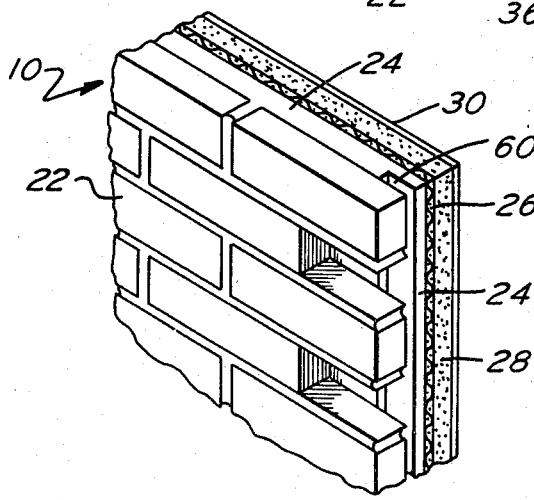
FIG. 11 is a partial perspective view of a panel in accordance with the present invention.

The closed cell foam polymer is cured in situ and forms a bond joining the layer 30 to the layer of mortar 24 and the reinforcing wire mesh 26. The entire composite as shown in FIG. 10 remains under compression until the foam polymer 28 has cured. The curing time is 15 to 30 minutes.

A house is assembled using the panels of the present invention as follows. After the foundation has been prepared, extruded channels 14 are positioned and attached to the foundation adjacent the periphery thereof. Vertical tubular columns are then installed at spaced points along ---
[1] The optimum frothing temperature will vary with the nature of the polyurethane foam, as will be appreciated by those having skill in the art.

the bottom of the channel and support a steel frame system from which the top channels 12 will be supported. The roof joists are also supported by the steel frame system.

The panels 10 and 10' constructed in accordance with the present invention are then slid along the top and bottom channels beginning from a corner of the building. Appropriate spaces are left for windows and doors. L-shaped panels made in accordance with the present invention are utilized in the corners of the building. All of the components of the dwellings, such as the panels, channels, trusses, tubular columns, etc., are factory constructed for ease of assembly at the job site. Two adjacent panels may be interconnected by the spline 20 and by field applied bricks such as bricks 18 at the joint between adjacent panels. Also, mortar may be applied to the joint between adjacent panels. For ease of installation, the panels may be numbered as to the sequence in which they will be installed.

The panels of the present invention are preferably made wholly from incombustible materials and utilize a core having the minimum of voids, while at the same time providing proper insulation and having weather resistance. The panels are capable of being fabricated from a wide range of materials, are easily transportable to the building site, and are easily joined to adjacent panels with minimum skill required by the workmen. The panels provide for maximum moisture resistance on the inner and outer surfaces and provide for resistance to fire, insects, and decay.

When installed, the panels 10 and 10' are not load bearing elements of the biulding. The major thickness of the panels is comprised of a foam 28 and the mortar 24. These are the lowest density components of the panels; for example, closed cell urethane foam at a nominal density of two pounds per cubic foot. Hence, it is possible by the present invention to construct panels having a relatively low density while being highly resistant to mositure and to cracking.

If desired, foam 28 may be introduced into the cavity above mortar 24 by pouring the foam polymer utilizing an oscillating nozzle instead of by frothing. If the foam polymer is poured, it will contain an expansion delay agent which will delay expansion up to two minutes. This will provide sufficient time to position the facing layer 30 in place and secure the same to the mold sides and thereafter move the conveyor so that force via the rollers or other devices may be applied to prevent the layer 30 from rising when the foam polymer expands.

A wide variety of urethane systems are available. For detailed discussion of such foam expansion delay agents, see *Rigid Plastic Foams*, by T. H. Ferrigno, Reinhold Publishing Corporation, Second Edition, 1967, pages 112 through 114, I prefer to use a system consisting of Hylene T.R.F. undistilled toluene disocyanate Selectrofoam 6500(SC17–35) master batch sold by PPG Industries, Inc. In each alternative for introducing the foam polymer into the cavity, the foam polymer is introduced at a temperature of about 155° F. and the cavity is closed by the facing layer before the foam polymer expands. Any conventional foaming temperatures can be used, such as a temperature of between 50 to 150° F.

A thermo-setting unsaturated polyester resin that is cross linked with styrene monomer is mixed. The proportions in this instance are 70% by weight glass sand, 30% by weight Selectron #5265 polester resin. Approximately .3% of methyl ethyl ketone peroxide is used as catalyst to actuate the resin. However the percentage of methyl ethyl ketone peroxide will vary with regard to the desired setting time and temperature of both the immediate environment and materials being used.

The properties of Selectron #5265 are:

1. Specific gravity 1.11
2. Weight 9.3 pounds per gallon
3. Viscosity 2.75 Brookfield centipoises.

The polyester mortar described above provided a bond strength between adjacent bricks of 450 p.s.i. as compared to a bond strength of about 25 p.s.i. attainable with cement mortars. Also, said polyester mixture provided a compressive strength approximately three times that of a Portland cement mortar.

In addition to strength, other attributes of the mortar 24 are:

(a) fire resistance
(b) quick air-drying or curing (less than 30 minutes)
(c) attain high strength quickly so that panels may be handled shortly after completion
(d) corrosion resistance
(e) toughness
(f) high resistance to ultraviolet rays of daylight
(g) freeze-thaw durability
(h) is not attacked by the foam polymer
(i) does not stick to the form sheet.

The subject panels had good fire resistance since they did not burn while having their edges exposed to 1200° F. for five minutes. After 40 cycles of freezing and thawing, a Portland cement mortar showed signs of deteriorating while the subject panels showed no signs of deteriorating after 94 cycles.

The present invention may be embodied in other specific forms without departing from the spirit or essential attributes thereof and, accordingly, reference should be made to the appended claims, rather than to the foregoing specification as indicating the scope of the invention.

I claim:

1. A method of making insulated building panels comprising the steps of providing a form layer having a plurality of spaced pockets defined on its upper surface with the layer surrounded by mold sides and ends, placing masonry members in said pockets, placing metallic wire mesh on said masonry members, applying a layer of quick drying polyester mortar through said wire mesh and onto the upper surface of said members and into the unfilled space between adjacent members, curing said mortar so as to form a bond between adjacent members, positioning a facing layer so that it cooperates with the mold sides and mold ends to define a closed cavity above said layer of mortar, introducing a foam urethane polymer into said cavity, expanding and curing said foam polymer in said cavity so that the foam polymer occupies the entirety of the cavity and bonds said facing layer to said layer of mortar, and then separating the thusly formed panel from said form layer.

2. A method in accordance with Claim 1 including using a form layer having integral ridges between adjacent pockets so as to project into the space between adjacent masonry members and define the lower limit to which the mortar may be applied between adjacent masonry members, and using a form layer made from a material which will not stick to said mortar.

3. A method in accordance with Claim 1 including applying pressure downwardly onto the upper surface of said facing layer to prevent the facing layer from moving upwardly when the foam polymer expands into said cavity, and maintaining the application of such pressure while the foam polymer is curing.

4. A method in accordance with Claim 1 wherein said step of introducing a foam polymer into said closed cavity includes introducing a conduit through one end of the mold, introducing a portion of the foam polymer through said conduit into said cavity, partially withdrawing said conduit, thereafter introducing more foam polymer into the cavity, and partially withdrawing the conduit again before introducing more foam polymer into said cavity.

5. A method in accordance with Claim 1 including using as said masonry members bricks which are thinner than their height, using pockets on said base which are rectangular, and placing said bricks in said pockets so that they lie on a major face of the bricks.

6. A method in accordance with Claim 1 including positioning an electrical outlet in said closed cavity so as to be accessible through said facing layer with a wireway conduit connected to the outlet, disposed in said closed cavity and extending to one end of the mold.

7. A method in accordance with Claim 1 including using an expansion delay agent in said foam polymer, pouring the foam polymer into said cavity, and closing said cavity wtih said facing layer before the foam polymer expands.

8. A method in accordance with Claim 1 including positioning said facing layer to close the cavity before the foam polymer is introduced into said cavity.

9. A method in accordance with Claim 1 in which prior to being placed within the pockets the masonry members are heated to a temperature such that they will not absorb heat from the foam polymer.

References Cited

UNITED STATES PATENTS

| | | | |
|---|---|---|---|
| 3,239,982 | 3/1966 | Nicosia | 264—45 |
| 3,523,989 | 8/1970 | Murer | 264—45 |

MELVYN I. MARQUIS, Primary Examiner

U.S. Cl. X.R.

264—253, 256, 261